US012768417B2

(12) United States Patent
Babu

(10) Patent No.: US 12,768,417 B2
(45) Date of Patent: Oct. 20, 2026

(54) DRUM BRAKE ASSEMBLY AND WEAR SENSOR DEVICE

(71) Applicant: ArvinMeritor Technology, LLC, Troy, MI (US)

(72) Inventor: Prathap Babu, Bangalore (IN)

(73) Assignee: ArvinMeritor Technology, LLC, Troy, MI (US)

( * ) Notice: Subject to any disclaimer, the term of this patent is extended or adjusted under 35 U.S.C. 154(b) by 413 days.

(21) Appl. No.: 18/503,331

(22) Filed: Nov. 7, 2023

(65) Prior Publication Data

US 2025/0146549 A1 May 8, 2025

(51) Int. Cl.

*F16D 66/02* (2006.01)
*F16D 51/22* (2006.01)
*F16D 125/30* (2012.01)

(52) U.S. Cl.

CPC ........... *F16D 66/024* (2013.01); *F16D 51/22* (2013.01); *F16D 66/027* (2013.01); *F16D 2125/30* (2013.01)

(58) Field of Classification Search

CPC ...... F16D 66/024; F16D 51/22; F16D 66/027; F16D 2125/30; F16D 65/22; F16D 51/20; F16D 66/023; F16D 66/026

See application file for complete search history.

(56) References Cited

U.S. PATENT DOCUMENTS

| | | | | |
|---|---|---|---|---|
| 3,339,676 | A * | 9/1967 | Quinn | F16D 65/46 188/1.11 R |
| 3,740,566 | A * | 6/1973 | Newstead | F16D 66/023 200/61.4 |
| 6,360,850 | B1 | 3/2002 | Odisho et al. | |
| 7,165,657 | B2 | 1/2007 | Palladino | |
| 9,045,122 | B2 | 6/2015 | Bosis et al. | |
| 2005/0077122 | A1 | 4/2005 | Harris et al. | |
| 2022/0049751 | A1 | 2/2022 | Shah et al. | |
| 2023/0265902 | A1 | 8/2023 | Sakhare et al. | |

OTHER PUBLICATIONS

European Patent No. EP 3971441 to Sakhare et al.published on Mar. 23, 2022.*

Adkins et al., U.S. Appl. No. 17/899,975, filed Aug. 31, 2022; 31 pages.

Ramachandra et al., U.S. Appl. No. 18/306,444, filed Apr. 25, 2023; 35 pages.

* cited by examiner

*Primary Examiner* — Pamela Rodriguez

(74) *Attorney, Agent, or Firm* — Dickinson Wright PLLC

(57) ABSTRACT

A drum brake assembly comprising first and second brake pad assemblies and a wear sensor device. The wear sensor device comprises a sleeve, a plunger, and a sensor. The sleeve is coupled to the first brake pad assembly. The plunger is coupled to the second brake pad assembly. The sensor provides a signal indicative of a position of the plunger with respect to the sleeve.

20 Claims, 4 Drawing Sheets

DRUM BRAKE ASSEMBLY AND WEAR SENSOR DEVICE

TECHNICAL FIELD

This relates to a drum brake assembly and a device for sensing wear of friction material of brake pad assemblies of the drum brake assembly.

BACKGROUND

A drum brake assembly and a brake lining sensor are disclosed in U.S. Pat. No. 6,360,850.

SUMMARY

The invention relates to a drum brake assembly. The drum brake assembly comprises first and second brake pad assemblies and a wear sensor device. The wear sensor device comprises a sleeve, a plunger, and a sensor. The plunger is coupled to the first brake pad assembly. The sleeve is coupled to the second brake pad assembly. The plunger is moveable with respect to the sleeve. The sensor provides a signal indicative of a position of the plunger with respect to the sleeve.

The sleeve may comprise a sleeve hole. The plunger may be at least partially disposed inside the sleeve hole. The sensor may be disposed on the sleeve. The plunger may be moveable with respect to the sensor. For example, the plunger may be moveable with respect to the sleeve when the first and second brake pad assemblies or actuated away from each other. The plunger may not move with respect to the sleeve when the first and second brake pad assembly are retracted toward each other.

The wear sensor device may further comprise a first mount. The first mount may extend from the first brake pad assembly. The first mount may further comprise a first mount hole. The plunger may extend through the first mount hole.

The plunger may comprise an enlarged head. The enlarged head may be sized to not pass through the first mount hole. The enlarged head may be engageable with a side of the first mount that faces away from the sleeve.

The plunger may extend along a wear sensor device axis. The enlarged head may be disposed at a first end of the plunger. The second mount hole may be axially positioned between the enlarged head and the sleeve.

The plunger may further comprise a core. The core may be received in the sleeve hole. The signal generated by the sensor may be indicative of a position of the core with respect to the sensor.

The core may further comprise a body. First and second arms may extend from the body. First and second pads may extend from the first and second arms, respectively. The first and second pads may engage the sleeve. The body and the first and second arms may not contact the sleeve.

A gap may extend between the first and second pads. The gap may extend between the first and second arms. The first and second arms may bias the first and second pads, respectively, against the sleeve. The first pad may further comprise material that is detectable by the sensor. The sensor may comprise a linear variable differential transformer.

The wear sensor device may further comprise a second mount. The second mount may couple the sleeve to the second brake pad assembly. The sleeve may have a free end. The free end may be disposed opposite the second mount. The core may be positioned closer to the free end of the sleeve as thickness of friction material of the first brake pad assembly decreases.

The drum brake assembly may further comprise a camshaft. The camshaft may be rotatable about a camshaft axis to actuate the first and second brake pad assemblies. The camshaft axis may intersect the wear sensor device.

The drum brake assembly may further comprise first and second cam rollers. The first and second cam rollers may engage the first and second brake pad assemblies, respectively. The camshaft may further comprise a cam. The cam may engage the first and second cam rollers. The wear sensor device may extend across the cam. The wear sensor device may extend across the first and second cam rollers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
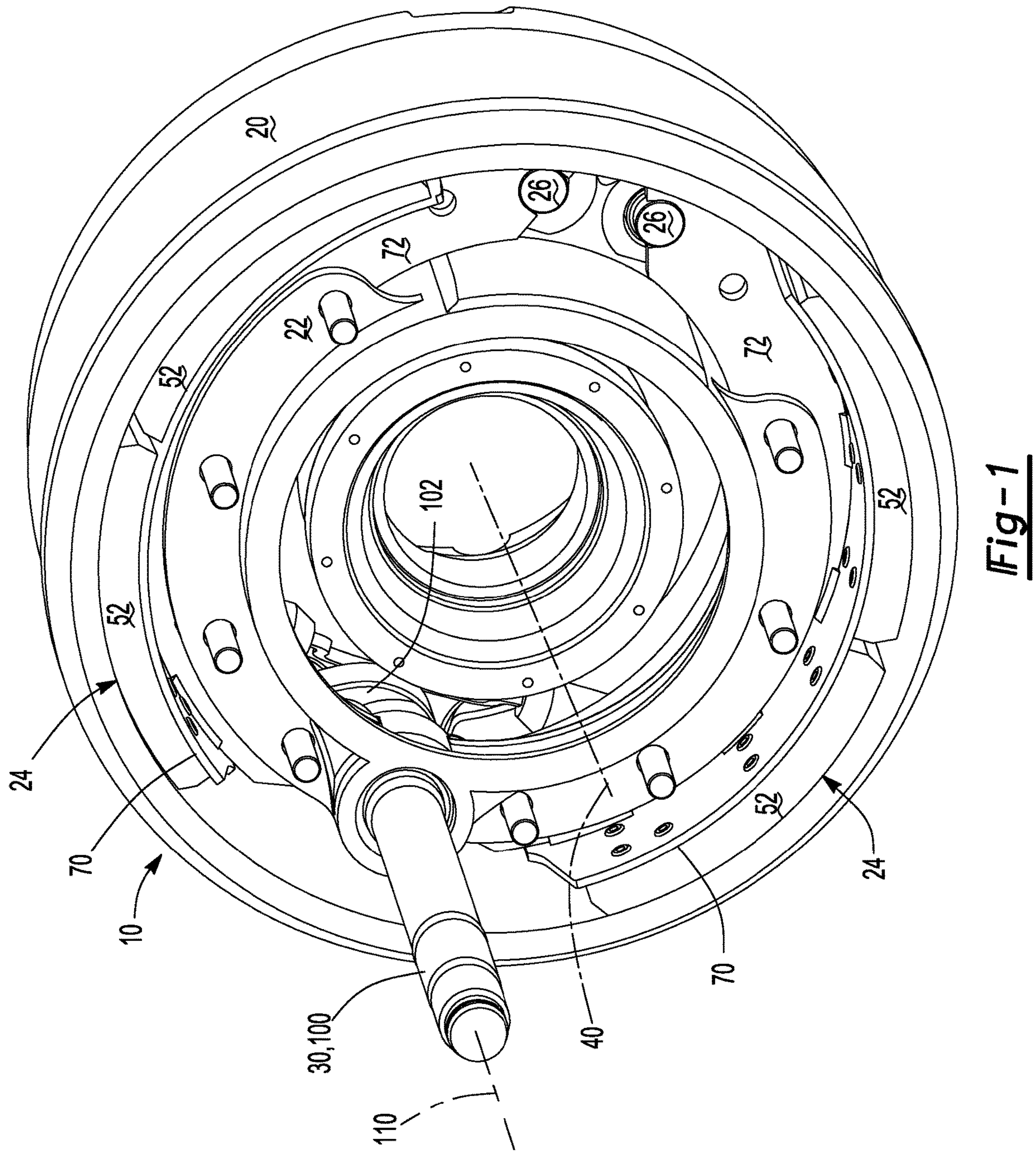
FIG. 1 is a perspective view of an example of a drum brake assembly and a brake drum.

Referring to FIG. 1, an example of a drum brake assembly 10 is shown. The drum brake assembly 10 may be provided with a vehicle like a truck, bus, farm equipment, mining equipment, transport or weaponry vehicle, or cargo loading equipment for land, air, or marine vessels. The vehicle may include a trailer or may be a trailer for transporting cargo in one or more embodiments.

The drum brake assembly 10 is configured to brake or slow the rotation of a vehicle wheel. The drum brake assembly 10 is associated with a brake drum 20. In some configurations, the drum brake assembly 10 includes a brake spider 22, at least one brake pad assembly 24, one or more anchor pins 26, one or more cam rollers 28, and a camshaft 30. The drum brake assembly 10 also includes a wear sensor device 32.

The brake drum 20 encircles the brake pad assemblies 24 and may encircle the brake spider 22. The brake drum 20 may be fixedly mounted to a wheel hub and is rotatable with the wheel hub about an axis 40. A vehicle wheel may be mounted to the wheel hub and may be rotatable about the axis 40 with the wheel hub and the brake drum 20. As such, the brake drum 20 may be rotatable about the axis 40 with respect to the brake spider 22 and the brake pad assemblies 24.

The brake spider 22 facilitates mounting of the drum brake assembly 10 to a structural component of the vehicle. For instance, the brake spider 22 may be fixedly mounted to a steering knuckle or an axle housing. The brake spider 22 may be disposed inside the brake drum 20 and may support the anchor pin 26 and the camshaft 30.

One or more brake pad assemblies 24 are configured to engage an inner surface of the brake drum 20 that faces toward the axis 40 to slow rotation of the wheel hub about the axis 40. In the configuration shown, two brake pad assemblies 24 are illustrated that are disposed generally opposite each other. For convenience in reference, these brake pad assemblies are referred to as a first brake pad assembly 24 and a second brake pad assembly 24. The brake pad assemblies 24 are moveable with respect to the brake spider 22 and may partially encircle the brake spider 22. As is best shown with reference to FIG. 2, the brake pad assembly 24 may include a brake shoe 50 and a friction material 52.

The brake shoe 50 is a structural member of a brake pad assembly 24. The brake shoe 50 may be pivotally mounted to the brake spider 22 at a first end via the anchor pin 26. As such, the brake shoe 50 may be pivotable or rotatable about an anchor pin axis 60. The anchor pin axis 60 may be disposed substantially parallel to the axis 40. The term "substantially parallel" as used herein means the same as or very close to parallel and includes features or axes that are within ±3° of being parallel each other. In at least one configuration, the brake shoe 50 includes a table 70 and at least one web 72.

The table 70 supports the friction material 52. The table 70 may be configured as a plate that extends along an arc. In at least one configuration, the table 70 may include a first table side and a second table side 82.

The first table side 80 faces toward the friction material 52 and may engage or contact the friction material 52. As such, the first table side 80 may face away from the web 72.

The second table side 82 may be disposed opposite the first table side 80. As such, the second table side 82 may face away from the friction material 52 and may face toward the web 72. In at least one configuration, the second table side 82 may be disposed substantially parallel to the first table side 80.

At least one web 72 may be provided with the brake shoe 50. In the configuration shown, two webs 72 are provided with each brake shoe 50. The webs 72 extend from the table 70 and may be fixedly coupled to the table 70. For instance, the webs 72 may extend from the second table side 82 in a direction that extends away from the first table side 80 and may be welded or otherwise fixedly coupled to the table 70. The webs 72 may be spaced apart from each other and may facilitate mounting of the brake pad assembly 24 to other components of the drum brake assembly 10. For example, a first notch may be provided at a first end of a web 72 and may receive the anchor pin 26. A second notch may be provided at the second end of the web 72 and may receive a cam roller 28 that is supported by the camshaft 30.

The friction material 52, which may also be called a brake lining, is disposed on the table 70. The friction material 52 may extend from the first table side 80 in a direction that extends away from the second table side 82. As such, the friction material 52 is oriented to face toward the inner surface of the brake drum 20. The friction material 52 may engage the inner surface of the brake drum 20 during friction braking or when brake torque is being provided by the drum brake assembly 10. The friction material 52 may be spaced apart from the brake drum 20 when friction braking is not being applied. The friction material 52 may be fixedly attached to the table 70 in any suitable manner. For instance, the friction material 52 may be fixedly attached to the table 70 with fasteners, such as rivets.

The anchor pin 26 is mounted to the brake spider 22 and supports a corresponding brake pad assembly 24. In some configurations, the anchor pin 26 is fixedly positioned with respect to the brake spider 22. The anchor pin 26 may be received in the first notches of the webs 72 of a corresponding brake pad assembly 24 such that the brake shoe 50 may pivot or rotate about the anchor pin axis 60. For instance, the brake pad assembly 24 may pivot or rotate with respect to the anchor pin 26 about an outer surface or outside circumference of the anchor pin 26 when the brake shoe 50 is actuated by the camshaft 30. It is also contemplated that the anchor pin 26 may be rotatably disposed on the brake spider 22, in which case the brake shoe 50 may pivot or rotate about the anchor pin axis 60 with the anchor pin 26.

The cam roller 28 extends between the brake pad assembly 24 and the camshaft 30. As such, the cam roller 28 supports a corresponding brake pad assembly 24 upon the camshaft 30. The cam roller 28 may be received in the second notches of the webs 72 of a corresponding brake pad assembly 24 such that the brake shoe 50 may pivot or rotate about a cam roller axis 90. The cam roller axis 90 may be disposed substantially parallel to the axis 40 and a corresponding anchor pin axis 60. For instance, the brake pad assembly 24 may pivot or rotate with respect to the cam roller 28 when the brake shoe 50 is actuated by the camshaft 30.

The camshaft 30 is configured to actuate the brake pad assemblies 24. The camshaft 30 may have any suitable configuration. For instance, the camshaft 30 may include a shaft 100 and a cam 102.

The shaft 100 is rotatable about a camshaft axis 110. In some configurations, the shaft 100 is rotatably supported on the brake spider 22.

The cam 102 extends from the shaft 100. For instance, the cam 102 may protrude or extend away from the camshaft axis 110 and the shaft 100. The cam 102 may be fixedly disposed on or integrally formed with the shaft 100. As such, the shaft 100 and the cam 102 are rotatable together about the camshaft axis 110. In some configurations, the cam 102 is configured as an S-cam that engages the cam rollers 28.

Figure 2:
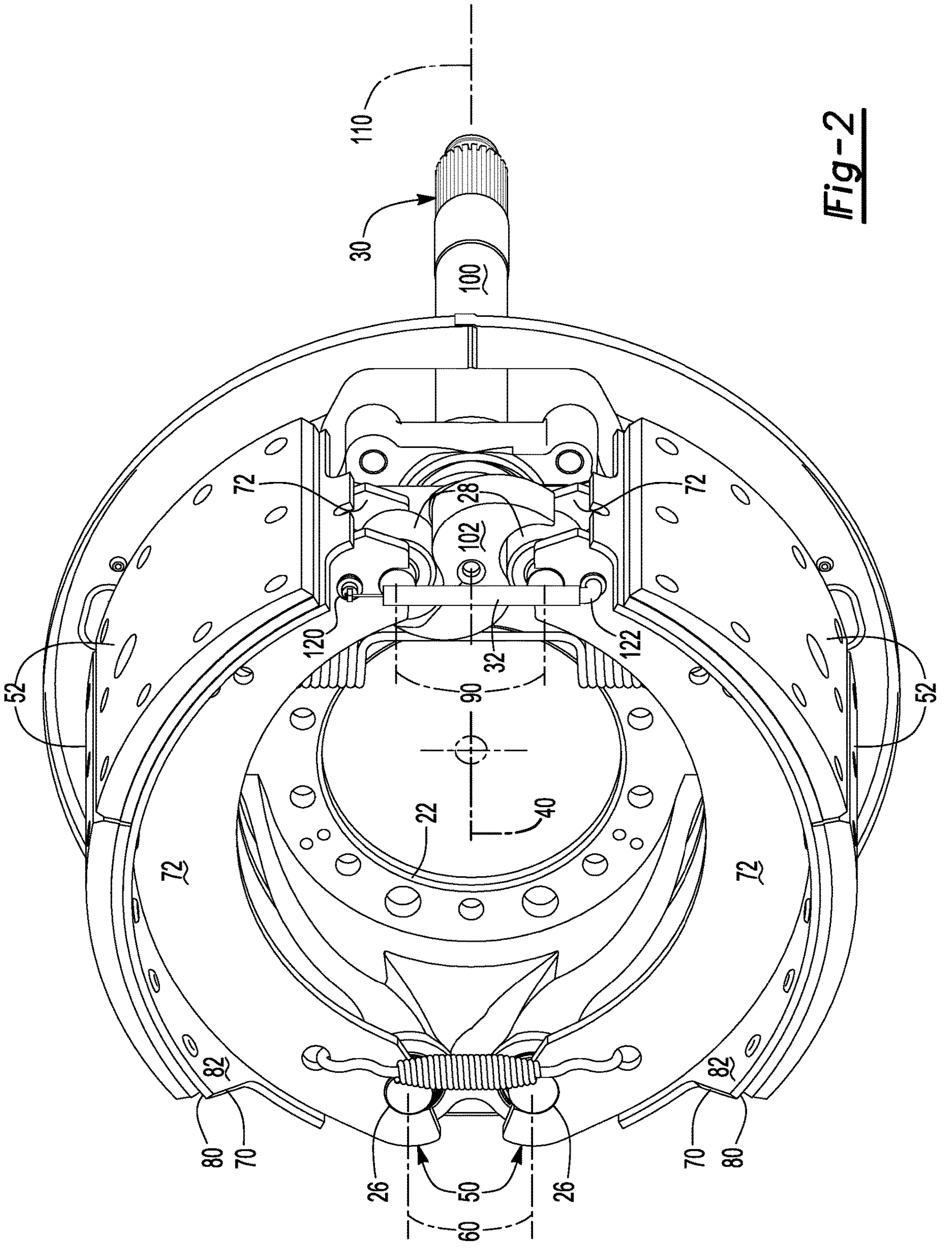
FIG. 2 is another perspective view of the drum brake assembly of FIG. 1 with the brake drum omitted for clarity and an example of a wear sensor device.
Figure 8:
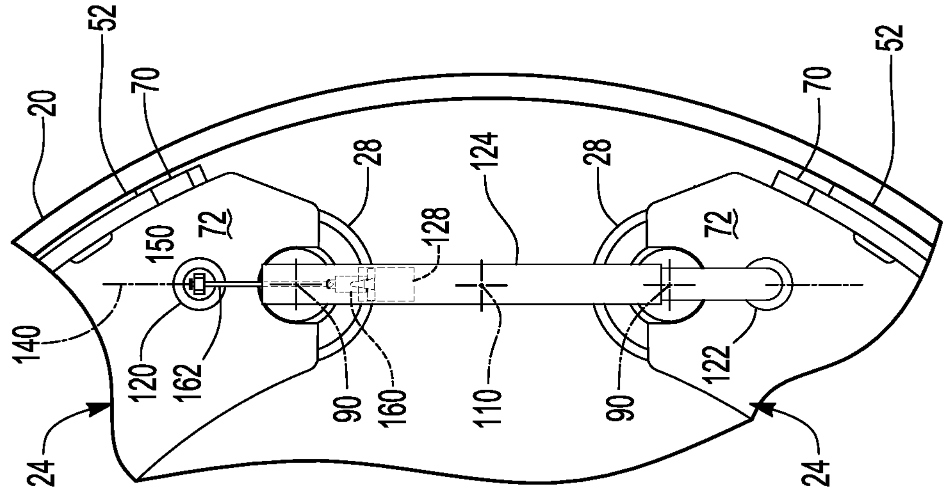
FIGS. 6-8 are simplified side views showing the wear sensor device and brake pad assemblies in first, second, and third positions in which friction material of the brake pad assemblies is unworn, partially worn, and nearly full worn, respectively.
Figure 7:
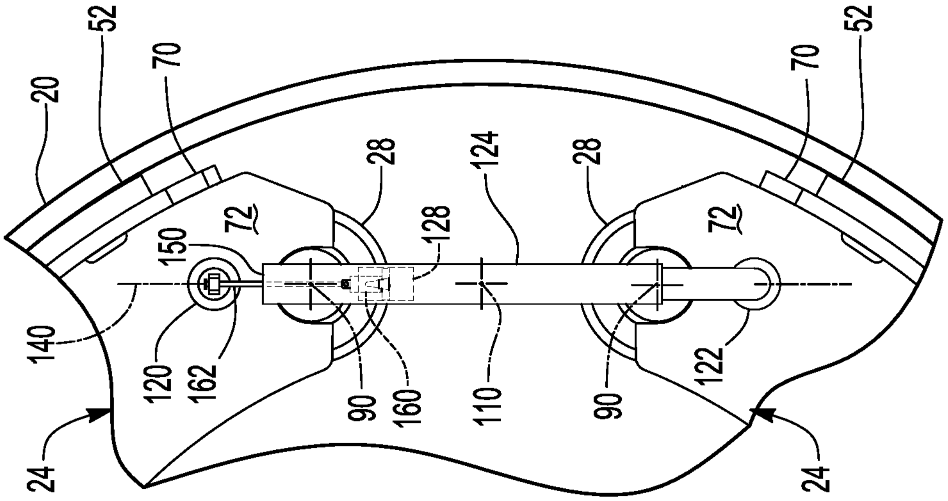
Figure 6:
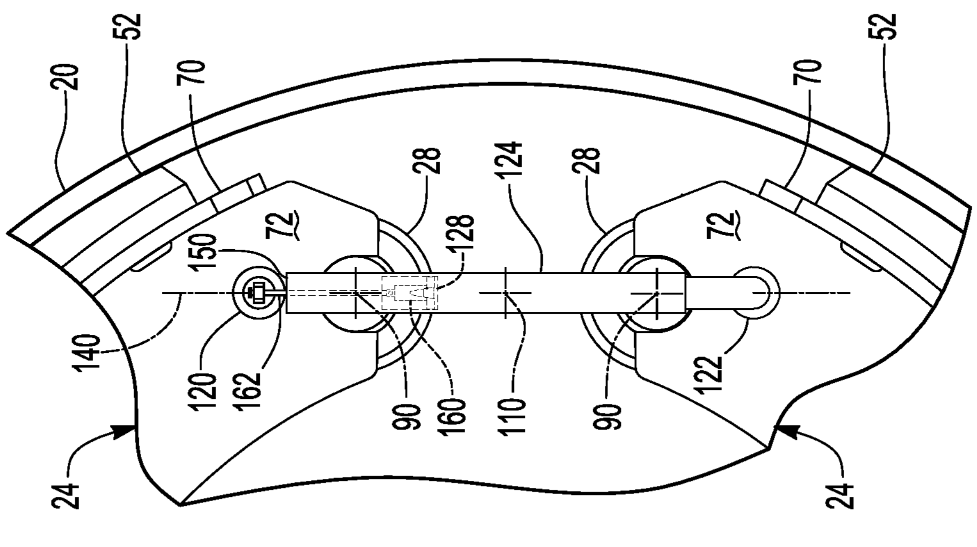

Rotation of the camshaft 30 in a first direction about the camshaft axis 110, such as in a counterclockwise direction from the perspective shown in FIG. 2, causes the cam 102 to actuate the cam rollers 28, 28 and the brake pad assemblies 24, 24 away from each other and away from the camshaft axis 110 such that the friction material 52 moves toward the inner surface of the brake drum 20 and upon sufficient rotation contacts or engages the inner surface of the brake drum 20 to brake, slow, or inhibit rotation of an associated wheel hub and wheel. Rotation of the camshaft 30 about the camshaft axis 110 in a second direction that is opposite the first direction may allow the cam rollers 28, 28 and brake pad assemblies 24, 24 to retract or move toward each other and toward the camshaft axis 110 and disengage the inner surface of the brake drum 20. The camshaft 30 may be rotated by an actuator as is known by those skilled in the art. As is best shown in FIGS. 6-8, the camshaft axis 110 may intersect the wear sensor device 32.

Figure 3:
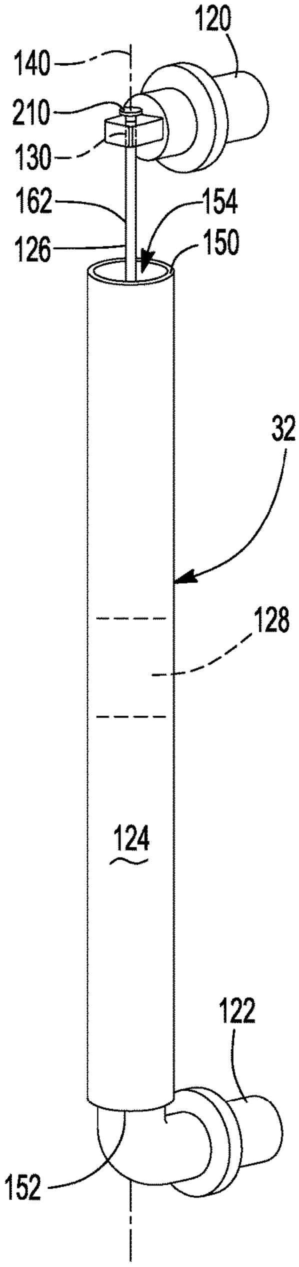
FIG. 3 is a perspective view of the wear sensor device shown in FIG. 2.
Figure 4:
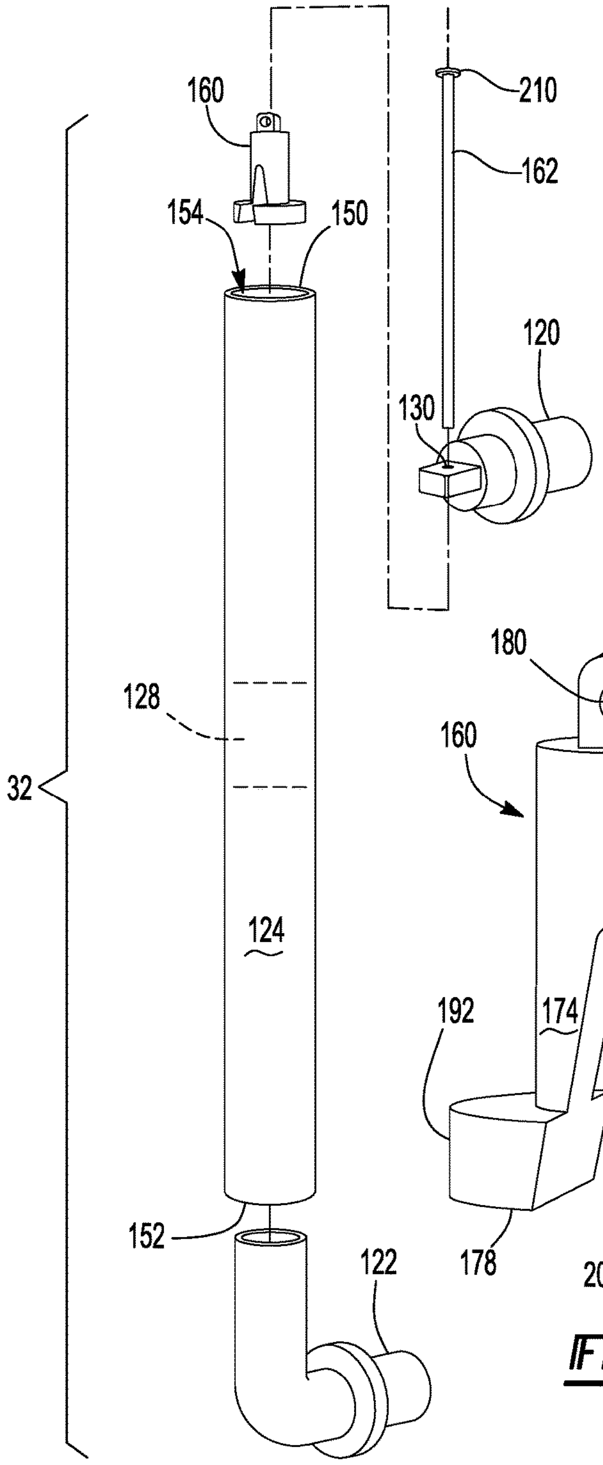
FIG. 4 is an exploded view of the wear sensor device.

Referring to FIGS. 2-4, the wear sensor device 32 is configured to provide a signal indicative of a state of wear of the friction material 52 of at least one brake pad assembly 24. The wear sensor device 32 may be disposed proximate the camshaft 30. For instance, the wear sensor device 32 may extend across the camshaft 30 and the first and second cam rollers 28, 28 as is best shown in FIGS. 6-8. In such a configuration, the camshaft axis 110 and the cam roller axes 90, 90 may intersect the wear sensor device 32. In some configurations and as is best shown with reference to FIGS. 3 and 4, the wear sensor device 32 includes a first mount 120, a second mount 122, a sleeve 124, a plunger 126, and a sensor 128.

The first mount 120 facilitates mounting of the plunger 126 to a brake pad assembly, such as the first brake pad assembly 24. For instance, the first mount 120 may be coupled to a brake shoe 50 of the first brake pad assembly 24. In some configurations, the first mount 120 may be coupled to a web 72 of the brake shoe 50. For example, the first mount 120 may be received in a hole in the web 72 or may be coupled to the web 72 in any suitable manner, such as with a fastener, adhesive, threaded connection, or the like. The first mount 120 may be rotatable with respect to the brake shoe 50 or fixed to the brake shoe 50. In some configurations, the first mount 120 includes or defines a first mount hole 130.

The first mount hole 130 may be a through hole in the first mount 120. The first mount hole 130 may extend along a wear sensor device axis 140. The wear sensor device axis 140 may be disposed substantially perpendicular to the axis 40, anchor pin axis 60, camshaft axis 110, or combinations thereof. The term "substantially perpendicular" is used herein to designate features or axes that are the same as or very close to perpendicular and includes features that are within ±3° of being perpendicular each other. The plunger 126 may extend through the first mount hole 130.

The second mount 122 facilitates mounting of the sleeve 124 to a brake pad assembly, such as the second brake pad assembly 24. For instance, the second mount 122 may be coupled to a brake shoe 50 of the second brake pad assembly 24. In some configurations, the second mount 122 may be coupled to a web 72 of the brake shoe 50. For example, the second mount 122 may be received in a hole in the web 72 or may be coupled to the web 72 in any suitable manner, such as with a fastener, adhesive, threaded connection, or the like. The second mount 122 may be rotatable with respect to the brake shoe 50 or fixed to the brake shoe 50. It is contemplated that the second mount 122 and the sleeve 124 may be integrally formed.

The sleeve 124 is coupled to a brake pad assembly 24, such as the second brake pad assembly 24. In addition, the sleeve 124 is detached from the first brake pad assembly 24. As such, the sleeve 124 may move with the second brake pad assembly 24 and may be moveable with respect to the first brake pad assembly 24. In some configurations, the sleeve 124 includes a first end 150, a second end 152, and a sleeve hole 154.

The first end 150 is a free end or distal end of the sleeve 124 that may be detached from the second brake pad assembly 24. For instance, the first end 150 may be disposed opposite the second mount 122. In some configurations, the first end 150 may be disposed adjacent to or may extend over the first brake pad assembly 24.

The second end 152 is disposed opposite the first end 150. For instance, the second end may be disposed adjacent to the second mount 122.

The sleeve hole 154 extends from the first end 150 toward or to the second end 152. The sleeve hole 154 may be disposed along and may be centered about the wear sensor device axis 140. An interior side of the sleeve 124 that faces toward the wear sensor device axis 140 at least partially defines the sleeve hole 154. In some configurations, the sleeve hole 154 has a substantially constant diameter.

The plunger 126 is coupled to a brake pad assembly 24, such as the first brake pad assembly 24. As such, the sleeve 124 and the plunger 126 may be coupled to different brake pad assemblies. The plunger 126 is moveable with the first brake pad assembly 24 and is moveable with respect to the sleeve 124. For instance, the plunger 126 may be moveable with respect to the sleeve 124, such as along the wear sensor device axis 140. The plunger 126 may be at least partially received inside or disposed inside the sleeve hole 154 and may be moveable or slidable in the sleeve hole 154 with respect to the sleeve 124. The plunger 126 is moveable with respect to the sensor 128. In some configurations, the plunger 126 includes a core 160 and a linkage 162.

Figure 5:
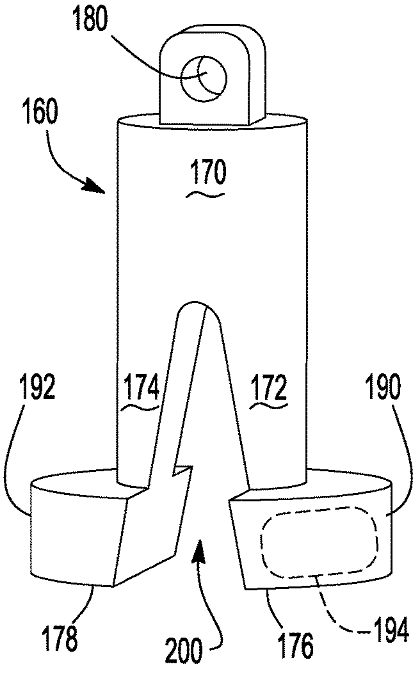
FIG. 5 is a perspective view of an example of a core of the wear sensor device.

Referring primarily to FIGS. 3 and 4, the core 160 is received in the sleeve hole 154 and is moveable or slidable along the wear sensor device axis 140 with respect to the sleeve 124. For instance, the core 160 may be received in the sleeve hole 154 and may be positioned between the first end 150 and the second end 152 of the sleeve 124. In some configurations and as is best shown in FIG. 5, the core 160 includes a body 170, a first arm 172, a second arm 174, a first pad 176, and a second pad 178.

The body 170 is receivable inside the sleeve hole 154. The body 170 may be spaced apart from and may not contact the sleeve 124. For instance, the body 170 may have a generally cylindrical configuration that has a smaller diameter than the sleeve hole 154. The body 170 is coupled to the linkage 162. The body 170 may be coupled to the linkage 162 in any suitable manner, such as by being integrally formed with the linkage 162 or being fastened to the linkage such as with a male connection, a female connection, fastener, adhesive, or the like. In the configuration shown, the body 170 has an aperture 180 to which the linkage 162 may be coupled. The aperture 180 may be provided in different orientations than that shown. For instance, the aperture 180 may be disposed along or substantially parallel to the wear sensor device axis 140.

The first arm 172 extends from the body 170. For instance, the first arm 172 may extend from the body 170 in a direction that extends away from the linkage 162. The first arm 172 may extend from the body 170 to the first pad 176. The first arm 172 may be spaced apart from and may not contact the sleeve 124. In some configurations, the first arm 172 may be configured to bias or hold the first pad 176 against the sleeve 124.

The second arm 174 extends from the body 170. For instance, the second arm 174 may extend from the body 170 in a direction that extends away from the linkage 162. The second arm 174 may extend from the body to the second pad 178. The second arm 174 may be spaced apart from and may not contact the sleeve 124. In some configurations, the second arm 174 may be configured to bias or hold the second pad 178 against the sleeve 124.

The first pad 176 extends from the first arm 172. For instance, the first pad 176 may extend from an end of the first arm 172 that is disposed opposite the body 170. The first pad 176 may contact or engage the sleeve 124. In some configurations, the first pad 176 extends farther from the wear sensor device axis 140 than the first arm 172 and engages or contacts the interior side of the sleeve 124. In such a configuration, the first pad 176 may have an arcuate surface 190 that faces away from the wear sensor device axis 140 and engages or contacts the interior side of the sleeve 124. The first pad 176 may be spaced apart from the second pad 178.

The second pad 178 extends from the second arm 174. For instance, the second pad 178 may extend from an end of the second arm 174 that is disposed opposite the body 170. The second pad 178 may contact or engage the sleeve 124. In some configurations, the second pad 178 extends farther from the wear sensor device axis 140 than the second arm 174 and engages or contacts the interior side of the sleeve 124. In such a configuration, the second pad 178 may have an arcuate surface 192 that faces away from the wear sensor device axis 140 and engages or contacts the interior side of the sleeve 124.

At least one of the first pad 176 and the second pad 178 may include material 194 that may be detectable by the sensor 128. In some configurations, the material 194 is encapsulated inside the pad. For instance, the material 194 may be a metal or metal alloy such as a ferrous material. The material 194 may be encapsulated inside of a nonferrous material, such as a polymer from which an associated pad may be made. It is contemplated that the core 160 may be made of a nonferrous material with the exception of the material 194, thereby allowing the position of the core 160 to be more precisely measured or determined.

A gap 200 may be provided between or extend between the first arm 172 and the second arm 174 and between the first pad 176 and the second pad 178. The gap 200 may permit the first arm 172 and the second arm 174 to bend or flex with respect to the sleeve 124. For instance, the gap 200 may permit the first arm 172 and the second arm 174 to bend or flex toward each other when the first pad 176 and the second pad 178 are inserted into the sleeve hole 154. As a result, the first arm 172 and the second arm 174 may bias the first pad 176 and the second pad 178 away from the wear sensor device axis 140 and toward the interior side of the sleeve 124. For example, the first arm 172 and the second arm 174 may bias the first pad 176 and the second pad 178 in opposite directions and urge the first arm 172 and the second arm 174 to exert force in opposite directions against the sleeve 124, which may allow the body 170 remain in a stationary position with respect to the sleeve 124 when sufficient force is not exerted on the body 170 via the linkage 162 as will be discussed in more detail below.

Referring primarily to FIGS. 3 and 4, the linkage 162 facilitates coupling of the core 160 to the first mount 120. The linkage 162 or a portion thereof may extend along the wear sensor device axis 140 and may be spaced apart from the sleeve 124. In some configurations, the linkage 162 extends from the body 170. For instance, the linkage 162 may be connected to the aperture 180. It is also contemplated that the linkage 162 may be integrally formed with the body 170 and that the aperture 180 may be omitted. In some configurations, the linkage 162 includes an enlarged head 210.

The enlarged head 210 helps connect the linkage 162 to the first mount 120. The enlarged head 210 may be disposed at or near an end of the plunger 126. For instance, the enlarged head 210 may be disposed at or near an end of the linkage 162. The enlarged head 210 may have a larger diameter than the first mount hole 130 or may otherwise be sized or shaped so as to not pass through the first mount hole 130. The enlarged head 210 may be engageable with a first side of the first mount 120 that faces away from the sleeve 124. As such, the first mount hole 130 may be axially positioned or positioned along the wear sensor device axis 140 between the enlarged head 210 and the sleeve 124.

The sensor 128 is configured to provide a signal indicative of a position of the plunger 126 with respect to the sleeve 124. In some configurations, the sensor 128 is disposed on the sleeve 124. For instance, the sensor 128 may be disposed outside the sleeve 124, inside the sleeve 124, or may be encapsulated in the sleeve 124. The signal generated by the sensor 128 may be indicative of a position of the core 160 respect to the sensor 128. The sensor 128 may be of any suitable type. For instance, the sensor 128 may be a proximity sensor, a linear displacement sensor like a linear variable differential transformer, or the like. For simplicity, an electrical connector or wiring harness that may extend from the sensor 128 to a data bus, controller, or control module is not shown for simplicity.

Referring to FIGS. 6-8, operation of the wear sensor device 32 will now be described in more detail. In these figures, a portion of the first and second brake pad assemblies 24, 24 that is located near the wear sensor device 32 is shown and the camshaft 30 and other background components of the drum brake assembly 10 are omitted for clarity.

In FIG. 6, the brake pad assemblies 24, 24 are shown with friction material 52 that is new or unworn. In addition, the brake pad assemblies 24, 24 are extended so that the friction material 52 engages the brake drum 20. The core 160 is positioned in the sleeve hole 154 near an end of the sensor 128 that is disposed farthest from the first end 150 of the sleeve 124. The sensor 128 provides a signal indicative of the position of the material 194 of the core 160 and hence the position of the plunger 126 with respect to the sleeve 124. The signal may be associated with a position that is indicative of friction material 52 that is new or unworn.

As the friction material 52 wears, the camshaft 30 may move the first and second brake pad assemblies 24, 24 farther away from the camshaft axis 110 when the camshaft 30 is rotated to move the brake pad assemblies 24, 24 against the brake drum 20. As a result, extending the brake pad assemblies 24, 24 may exert force on the enlarged head 210 that may actuate the plunger 126 with respect to the sleeve 124 and move the core 160 closer to the first end 150 of the sleeve 124. More specifically, when the brake pad assemblies 24, 24 are extended the first mount 120 may engage and exert force against the enlarged head 210 that moves the core 160 along the wear sensor device axis 140 and closer to the first end 150 of the sleeve 124 as the thickness of the friction material 52 of at least one brake pad assembly 24 decreases. Thus, the plunger 126 is moveable with respect to the sleeve 124 when the first and second brake pad assemblies 24, 24 are actuated away from each other.

In FIG. 7, the brake pad assemblies 24, 24 are shown with friction material 52 that is partially worn. In addition, the brake pad assemblies 24, 24 are extended so that the friction material 52 engages the brake drum 20. As such, the distance between the camshaft axis 110 and each cam roller axis 90 is greater in FIG. 7 than in FIG. 6. The core 160 is positioned in the sleeve hole 154 closer to the end of the sensor 128 that is disposed closest to the first end 150 of the sleeve 124 as compared to the position shown in FIG. 6. The sensor 128 provides a signal that is indicative of the position of the material 194 and hence the position of the plunger 126 with respect to the sleeve 124 that differs from the signal associated with the position shown in FIG. 6. The signal in this position may be associated with friction material 52 that is partially worn, such as approximately half worn or 50% worn.

In FIG. 8, the brake pad assemblies 24, 24 are shown with friction material 52 that is nearly fully worn. In addition, the brake pad assemblies 24, 24 are extended so that the friction material 52 engages the brake drum 20. As such, the distance between the camshaft axis 110 and each cam roller axis 90 is greater in FIG. 8 than in FIG. 7. The core 160 is positioned in the sleeve hole 154 closer to the end of the sensor 128 that is disposed closest to the first end 150 of the sleeve 124 as compared to the position shown in FIG. 7. The sensor 128 provides a signal that is indicative of the position of the material 194 and hence the position of the plunger 126 with respect to the sleeve 124 that differs from the signal associated with the position shown in FIG. 6 and FIG. 7. The signal in this position may be associated with friction material 52 that is nearly fully worn and thus indicative of a brake pad assembly 24 that should be serviced or replaced.

The plunger 126 may hold its position in the sleeve 124 when the brake pad assemblies are retracted from the positions shown in FIGS. 6-8. For instance, the biasing force exerted by the first and second pads 176, 178 may hold the core 160 in a stationary position with respect to the sleeve 124 when the brake pad assemblies 24, 24 are retracted. More specifically, the first and second brake pad assemblies 24, 24 may move toward the camshaft axis 110 when retracted, the sleeve 124 may move with the second brake pad assembly 24 toward the camshaft axis 110, but the plunger 126 may not move with respect to the sleeve 124 as the linkage 162 may extend farther through the first mount hole 130 as the first brake pad assembly 24 is retracted. Thus, the enlarged head 210 may disengage and move axially away from the first mount 120. Thus, the plunger 126 does not move with respect to the sleeve 124 when the first and second brake pad assemblies 24, 24 are retracted toward each other.

The signal from the sensor 128 may be communicated wirelessly or electronically to a controller, which in turn may communicate with a vehicle operator. For instance, a visual signal, audible signal, haptic signal, or combinations thereof may be provided to a vehicle operator when the signal is indicative of a nearly fully worn brake pad assembly.

A drum brake assembly and wear sensor device as described above may allow the state of wear of friction material of brake pad assemblies to be continuously or electronically monitored. As a result, the state of wear can be monitored and communicated to a vehicle operator or a vehicle maintenance management system without manual inspection or manual measurement of the thickness of the friction material, which may be difficult to access and visually inspect. The wear sensor device may be compatible with drum brake assemblies made by different manufacturers. The wear sensor device may be easier to package than sensors that detect the rotation of or angle of rotation of the camshaft. In addition, the wear sensor device may provide a more stable signal or more accurate signal than a sensor that detects rotation of the camshaft. For instance, the wear sensor device may directly measure the actuation distance or linear movement of the brake pad assemblies with respect to each other and maintain a stationary position when the brake pad assemblies are not actuated so that a continuous signal or signal with less fluctuation may be provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drum brake assembly comprising:
first and second brake pad assemblies; and
a wear sensor device that comprises:
a plunger that is coupled to the first brake pad assembly;
a sleeve that is coupled to the second brake pad assembly, wherein the plunger is moveable with respect to the sleeve; and
a sensor that provides a signal indicative of a position of the plunger with respect to the sleeve,
wherein the plunger moves with respect to the sleeve in response to the first and second brake pad assemblies moving away from each other.

2. The drum brake assembly of claim 1 wherein the sensor is disposed on the sleeve and the plunger is moveable with respect to the sensor.

3. The drum brake assembly of claim 1 wherein the sleeve further comprises a sleeve hole and the plunger is at least partially disposed inside the sleeve hole.

4. The drum brake assembly of claim 1 wherein the plunger does not move with respect to the sleeve when the first and second brake pad assemblies are retracted toward each other.

5. The drum brake assembly of claim 1 wherein the wear sensor device further comprises a first mount that extends from the first brake pad assembly, wherein the first mount further comprises a first mount hole, and the plunger extends through the first mount hole.

6. The drum brake assembly of claim 5 wherein the plunger further comprises an enlarged head that is sized to not pass through the first mount hole, wherein the enlarged head is engageable with a side of the first mount that faces away from the sleeve.

7. The drum brake assembly of claim 6 wherein the plunger extends along a wear sensor device axis, the enlarged head is disposed at a first end of the plunger, and the first mount hole is axially positioned between the enlarged head and the sleeve.

8. The drum brake assembly of claim 1 wherein the sleeve further comprises a sleeve hole, the plunger further comprises a core that is received in the sleeve hole, and the signal generated by the sensor is indicative of a position of the core with respect to the sensor.

9. The drum brake assembly of claim 8 wherein the core further comprises a body, first and second arms that extend from the body, and first and second pads that extend from the first and second arms, respectively, wherein the first and second pads engage the sleeve.

10. The drum brake assembly of claim 9 wherein the body and the first and second arms do not contact the sleeve.

11. The drum brake assembly of claim 9 wherein a gap extends between the first and second pads.

12. The drum brake assembly of claim 11 wherein the gap extends between the first and second arms.

13. The drum brake assembly of claim 9 wherein the first and second arms bias the first and second pads, respectively, against the sleeve.

14. The drum brake assembly of claim 9 wherein the first pad further comprises material that is detectable by the sensor.

15. The drum brake assembly of claim 5 wherein the plunger further comprises a core that is received inside the sleeve, the wear sensor device further comprises a second mount that couples the sleeve to the second brake pad assembly, and the sleeve further comprises a free end that is disposed opposite the second mount, wherein the core is positioned closer to the free end of the sleeve as thickness of friction material of the first brake pad assembly decreases.

16. The drum brake assembly of claim 1 wherein the sensor comprises a linear variable differential transformer.

17. The drum brake assembly of claim 1 wherein the drum brake assembly further comprises a camshaft that is rotatable about a camshaft axis to actuate the first and second brake pad assemblies, wherein the camshaft axis intersects the wear sensor device.

18. The drum brake assembly of claim 1 further comprising first and second cam rollers that engage the first and second brake pad assemblies, respectively, and a camshaft that is rotatable about a camshaft axis to actuate the first and second brake pad assemblies, wherein the camshaft further comprises a cam that engages the first and second cam rollers, and the wear sensor device extends across the cam.

19. The drum brake assembly of claim 18 wherein the wear sensor device extends across the first and second cam rollers.

20. A drum brake assembly comprising:

first and second brake pad assemblies; and a wear sensor device that comprises:

a sleeve that is coupled to the second brake pad assembly, wherein a plunger is moveable with respect to the sleeve;

the plunger that is coupled to the first brake pad assembly, the plunger provided with a body, a first arm, and a second arm, the first and second arms extending from the body and configured to engage the sleeve; and a sensor that provides a signal indicative of a position of the plunger with respect to the sleeve.

* * * * *